United States Patent
Rash et al.

(10) Patent No.: US 9,141,461 B2
(45) Date of Patent: Sep. 22, 2015

(54) MACHINE CHECK ARCHITECTURE EXECUTION ENVIRONMENT FOR NON-MICROCODED PROCESSOR

(71) Applicants: Willam C. Rash, Saratoga, CA (US); Scott D. Hanh, Portland, CA (US); Glenn J. Hinton, Portland, OR (US)

(72) Inventors: Willam C. Rash, Saratoga, CA (US); Scott D. Hanh, Portland, CA (US); Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 13/924,585

(22) Filed: Jun. 23, 2013

(65) Prior Publication Data

US 2014/0380085 A1 Dec. 25, 2014

(51) Int. Cl.
*G06F 11/00* (2006.01)
*G06F 11/07* (2006.01)
*G06F 11/14* (2006.01)

(52) U.S. Cl.
CPC ........ *G06F 11/0772* (2013.01); *G06F 11/1415* (2013.01); *G06F 11/142* (2013.01); *G06F 11/1443* (2013.01); *G06F 2201/815* (2013.01)

(58) Field of Classification Search
CPC ..................... G06F 11/0772; G06F 11/1415
See application file for complete search history.

(56) References Cited

U.S. PATENT DOCUMENTS

| | | | |
|---|---|---|---|
| 7,802,073 B1 * | 9/2010 | Cheng et al. | 712/10 |
| 2013/0051249 A1 * | 2/2013 | Bartlett et al. | 370/246 |

* cited by examiner

*Primary Examiner* — Joshua P Lottich
(74) *Attorney, Agent, or Firm* — Lowenstein Sandler LLP

(57) ABSTRACT

A technology for implementing a method for a machine check architecture environment. A method of the disclosure includes obtaining an occurrence of an error. The occurrence of the error causes a non-microcoded processing device to enter an error monitoring state. The method further processes the error using a dedicated memory portion for the error monitoring state while the non-microcoded processing device is in the error monitoring state. The error monitoring state is dedicated to error processing. The method further determines information associated with the error. The information associated with the error is in a predefined format.

20 Claims, 12 Drawing Sheets

MACHINE CHECK ARCHITECTURE EXECUTION ENVIRONMENT FOR NON-MICROCODED PROCESSOR

TECHNICAL FIELD

Embodiments described herein generally relate to processing devices and, more specifically, relate to a machine check architecture execution environment for non-microcoded processing devices.

BACKGROUND

A computing system can include processing devices (e.g., microprocessors, etc.), which are increasing in complexity, core count, cache size, number, etc. With this increase, the processing devices can become more susceptible to errors. An error can be detected by error detection logic in the computing system. An error can be a hard error, can result from the value of a bit of memory (e.g., DRAM) spontaneously flipping to the opposite state (e.g., 0 to 1 or 1 to 0), etc. The errors can result from one-time upsets caused by local radiation, errors due to one-time upsets caused by cosmic radiation, hard errors, etc. Some of the errors may be recoverable, while other errors may not be recoverable. The errors that are not recoverable may be contained to prevent the error from stopping the computing system.

The decision on recovery and actions to minimize the scope of program disruption due to uncorrected error falls on software. A standardized means of reporting error information is required although hardware implementations may be different. A machine check architecture provides a standardized means to report errors to software.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
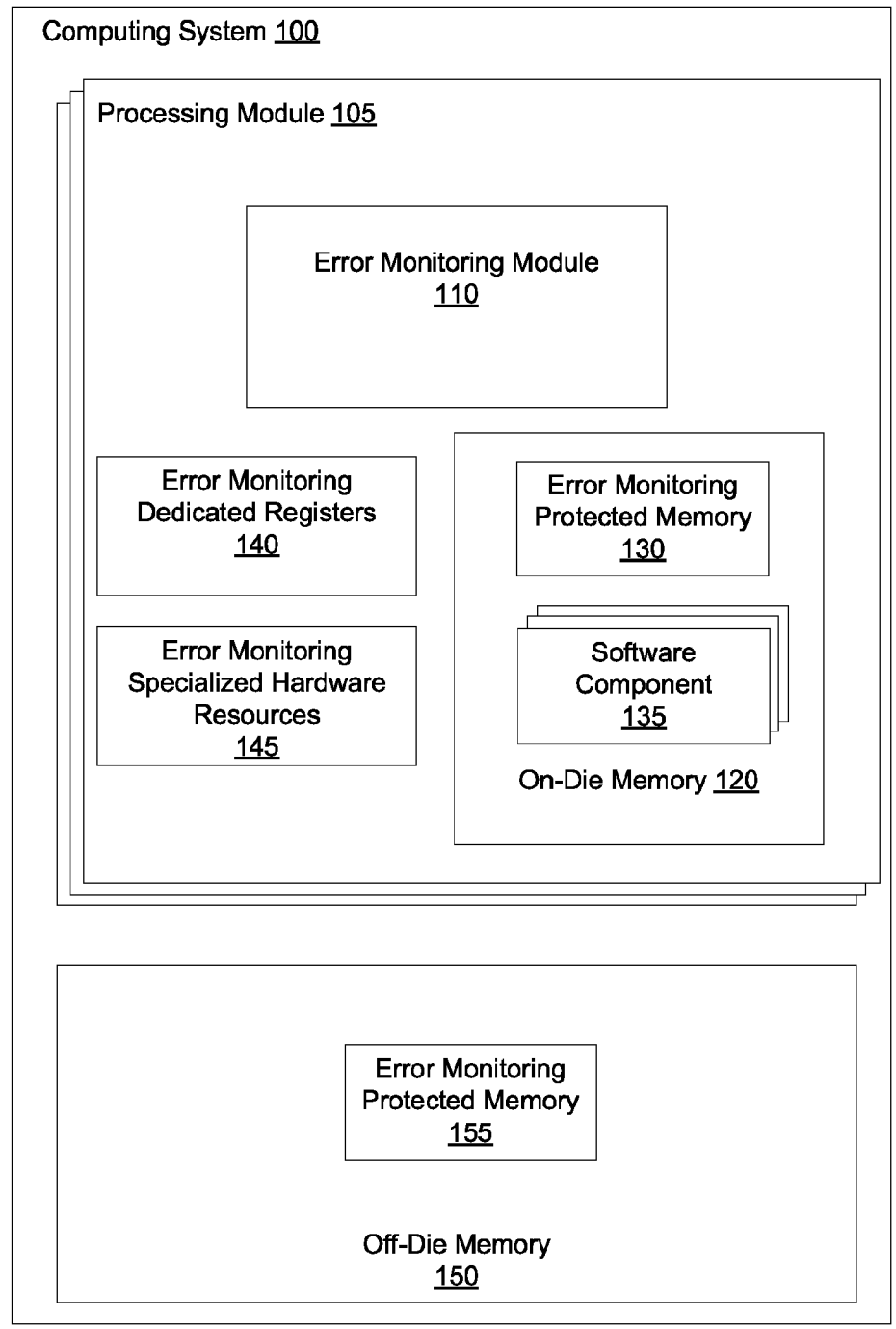
FIG. 1 is a block diagram of one embodiment of a computing system including a non-microcoded processing module that implements a machine check architecture execution environment.

Error detection logic, implemented in hardware in a computing system, can detect an error that occurs in a computing system. An error reporting and recovery monitoring mechanism, such as machine check architecture or failure capture mechanism, can be implemented by the computing system to provide the error to higher level software (an operating system, virtual machine manager, etc.) from the error detection logic. If the error is recoverable, the error reporting and recovery monitoring mechanism can cause the computing system to recover from the error and/or report error information about the error to the higher level software (e.g., operating system). If the error is not recoverable, the error monitoring mechanism can report the error information to the higher level software and/or force a reset of the computing system. The higher level software can perform additional analysis or make decisions based on the error information, such as whether to recover an application associated with the error, terminate an application associated with the error, etc. The higher level software may require that the error monitoring mechanism present the error information in a predefined format in order to perform the additional analysis or make decisions across multiple hardware implementations.

Processing devices with microcode can implement the error monitoring mechanism in microcode, which can work with many different hardware implementations of error detection logic and report the error information in the predefined format required by higher level software. However, if a processing device is a non-microcoded processing device, meaning that the processing device does not have microcode, the error monitoring mechanism may not be implemented or may not provide the error information in the predefined format.

Embodiments of the disclosure provide for an error monitoring environment for a non-microcoded processing device. The error monitoring environment can be consistent across different hardware implementations and provide the error information in the predefined format to higher level software. In one embodiment, a method of the disclosure includes obtaining an occurrence of an error. The method further processes the error in an error monitoring state using a dedicated memory portion for the error monitoring state. Processing the error in the error monitoring state processes data and memory with different semantics and means to avoid further errors than in another execution state. The method further determines information associated with the error to provide to a software program or application, such as an operating system or a virtual machine manager. The information associated with the error is provided in a predefined format.

By processing the error in the error monitoring environment, information associated with the error is provided in a predefined format in a computing system without microcode. The predefined format can be used by higher level software, such as an operating system or a virtual machine manager, to make decisions about the error and how to further handle the error.

FIG. 1 is a block diagram of a computing system 100 that implements a machine check architecture environment for non-microcoded processing devices. Some examples of computing system 100 may include, but are not limited to computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

Computing system 100 may include, for example, one or more processing modules 105 to handle operations for computing system 100 and an off-die memory 150. Each processing module 105 may comprise one or more processing devices (also known as processors) situated in separate component, or alternatively, one or more processing cores embodied in a single integrated circuit (IC) arranged, for example, in a System-on-a-Chip (SOC) configuration. In some embodiments, the processing device is a general purpose processing device. For example, each processing module 105 includes processing devices of the type commonly used as a central processing unit (CPU). In other embodiments, the processing device may be a special-purpose processing device. Examples of special purpose processors include, but are not limited to, co-processing devices, graphics processing devices, communications processing devices, network processing devices, cryptographic processing devices, embedded processing devices, digital signal processing devices (DSPs), etc. Each processing modules 105 can be connected to a socket. In some embodiments, if there are multiple processing modules 105, the processing modules 105 can be connected to the same socket or different sockets.

Off-die memory 150 can be coupled to the processing module 105 in the computing system 100. Off-die memory 150 and the processing module 105 can be coupled by a coupling mechanism as known in the art, such as an interconnect, a bus, a hub, a memory controller, a chipset, a chipset component, and combinations. Off-die memory 150 can include one or more memory devices of either the same or different types. Off-die memory 150 may include random access memory (RAM), non-volatile memory, or read-only memory (ROM) in a fixed or removable format. RAM may include memory to hold information during the operation of the computing system 100 such as, for example, static RAM (SRAM) or dynamic RAM (DRAM) or non-volatile memory. ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (e.g., USB, micro-SD, etc.), optical memories such as compact disc-based ROM (CD-ROM), holographic, etc.

Although each of processing module 105 and off-die memory 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Each processing module 105 may include an error monitoring module 110, on-die memory 120, error monitoring dedicated registers 140, and error monitoring specialized hardware resources 145.

Error monitoring module 110 can execute instructions. Instructions may include program code to cause error monitoring module 110 to perform activities such as, but not limited to, reading data, writing data, processing data, formulating data, converting data, transforming data, etc. Information, including instructions, data, etc. (not shown) may be stored in error monitoring protected memory 130 stored in on-die memory 120.

On-die memory 120 may include random access memory (RAM), non-volatile memory, or read-only memory (ROM) in a fixed or removable format. RAM may include memory to hold information during the operation of computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. An embodiment of on-die memory 120 may include error monitoring protected memory 130 and one or more software components 135. Error monitoring protected memory 130 can be protected such that error monitoring protected memory 130 is accessible and/or modifiable by error monitoring module 110. For example, error monitoring protected memory 130 is protected such that error monitoring protected memory 130 is accessible and/or modifiable only by error monitoring module 110. Error monitoring protected memory 130 can include code and/or instructions for an error monitoring environment and error monitoring protected memory 130 can be executed by error monitoring module 110. Software components 135 can include applications, programs, an operating system, a virtual machine manager, a BIOS, etc.

Error monitoring dedicated registers 140 can include registers and/or storage required during execution of instructions by error monitoring module 110 while the computing system 100 is in an error monitoring state. Error monitoring dedicated registers 140 can include registers for temporary values, a stack pointer, a pointer to an error monitoring information area, temporary storage for instructions to execute, a severity register to store the severity of an error in the computing system 100, etc. Error monitoring dedicated registers 140 can be protected such that error monitoring dedicated registers 140 are accessible and/or modifiable only by error monitoring module 110. Some of the registers in error monitoring dedicated registers 140 may be readable to software executing outside of error monitoring module 110.

Error monitoring specialized hardware resources 145 can include one or more state machines to be initiated by error monitoring module 110. Each state machine in error monitoring specialized hardware resources 145 can test operation of hardware (not shown) in computing system 100 while computing system 100 is in an error monitoring mode. Error monitoring specialized hardware resources 145 can test operation of hardware in a way that cannot be tested by software component 130. For example, error monitoring specialized hardware resources 145 includes a state machine that initiates hardware operations to test a cache. In another example, error monitoring specialized hardware resources 145 includes a state machine that initiates hardware operations to test a memory.

Off-die memory 150 may include random access memory (RAM), non-volatile writable memory, or read-only memory (ROM) in a fixed or removable format. RAM may include memory to hold information during the operation of the computing system 100 such as, for example, static RAM (SRAM) or dynamic RAM (DRAM). ROM may include memories such as computing device BIOS memory to provide instructions when computing system 100 activates, programmable memories such as electronic programmable ROMs (EPROMs), Flash, etc. Other fixed and/or removable memory may include magnetic memories such as floppy disks, hard drives, etc., electronic memories such as solid state Flash memory (e.g., eMMC, etc.), removable memory cards or sticks (E.g., USB, micro-SD, etc.), optical memories such as compact disc-based ROM (CD-ROM), holographic, etc. In an embodiment, off-die memory 150 may include error monitoring protected memory 155. Error monitoring protected memory 155 can be in a protected region of off-die memory 150 that cannot be changed by any devices other than processing module 110. For example, error monitoring protected memory 155 cannot be changed by input/output (I/O) devices, processing device other than processing module 110, etc. Error monitoring protected memory 155 can be accessible and/or modifiable only while the processing module 105 is in an error monitoring state (e.g., error monitoring module 110 is executing). Error monitoring protected memory 155 can include code and/or instructions for an error monitoring environment (e.g., machine check architecture environment), error information collected by processing module 110 (e.g., a data structure for the error information), a flag associated with processing module 110 to indicate if processing module 110 has stopped execution, a flag associated with one or more processing devices (not shown) in computing system 100 to indicate if the one or more processing devices have stopped execution, a severe error flag to indicate whether the computing system 100 encountered a severe error, a severity register to store information associated with the sever error, a fault suppress flag to indicate that processing module 110 suppressed a fault that occurred after the occurrence of the initial error, an error suppress flag to indicate that processing module 110 suppressed an additional error that occurred after the occurrence of the initial error, and a security policy violation flag to indicate that processing module 110 allowed the violation of a security policy to be violated after the occurrence of the initial error. The code for the error monitoring environment can be used to process an error encountered by the computing system 105. At least a portion of error monitoring protected memory 155 (e.g., the severity flag, severity register, etc.) can retain or save its state across a reset such that software (not shown), such as an operating system or a virtual machine manager, can access error monitoring protected memory 155 after a reset and obtain information from error monitoring protected memory 155 about an error (e.g., error that caused the reset).

During operation of the computing system 100, a software component 135, such as an application or a program, may encounter an error. The occurrence of the error is obtained by the error monitoring module 110. Error monitoring module 110 can place the computing system 100 into an error monitoring state by executing code in error monitoring protected memory 130.

Error monitoring module 110 can process the error in the error monitoring state using error monitoring protected memory 130. Error monitoring module 110 can process the error by modifying the execution of instructions in computing system 100 to suppress any faults, errors, or interrupts that occur in processing module 105. If a fault, error, or interrupt is suppressed, error monitoring module 110 can store information associated with the suppressed fault, error, or interrupt in error monitoring dedicated registers 140, on-die memory 120, or error monitoring protected memory 155. If error monitoring module 110 suppresses a fault, error, or interrupt, error monitoring module 110 can set a flag indicating that a fault, error, or interrupt was suppressed. The flag can be in error monitoring dedicated registers 140, on-die memory 120, or error monitoring protected memory 155. For example, error monitoring module 110 can set a fault suppress flag if a fault was suppressed, an error suppress flag if an additional error was suppressed, and/or an interrupt suppress flag if an interrupt was suppressed. Error monitoring module 110 can use the flags to avoid causing additional errors in the computing system 100.

Error monitoring module 110 can process the error by allowing one or more security policies associated with computing system 100 to be violated. A security policy can be associated with memory, and can permit or deny access to the memory. While in the error monitoring state, error monitoring module 110 can violate the security policy by accessing portions of on-die memory 120 or off-die memory 150 that error monitoring module 110 may not have permission to access. If error monitoring module 110 allows a security policy associated with computing system 100 to be violated, error monitoring module 110 can set a security policy violation flag in error monitoring dedicated registers 140, on-die memory 120, or error monitoring protected memory 155. Error monitoring module 110 can use the flag to avoid causing additional errors in the computing system 100.

Error monitoring module 110 can process the error (and therefore recover from the error) by determining if corrected data can be obtained. Error monitoring module 110 can determine if corrected data can be obtained by accessing storage, such as on-die memory 120, off-die memory 150, or other memory (not shown). While executing the code, error monitoring module 110 can use one or more registers in error monitoring dedicated registers 140 to store temporary values required by the execution of the code.

Error monitoring module 110 may determine that execution cannot proceed based on determining if corrected data can be obtained. In one embodiment, error monitoring module 110 determines that the execution cannot proceed if corrected data cannot be obtained. If error monitoring module 110 determines that execution can proceed, error monitoring module 110 can process the error by passing control to higher-level software, such as an operating system or virtual machine manager. If error monitoring module 110 determines that execution cannot proceed, error monitoring module 110 can process the error by forcing a reset of computing system 100 if the computing system 100 can minimally recover from the error. Prior to forcing a reset of computing system 100, error monitoring module 110 can store information related to the reason for the reset and the error in error monitoring protected memory 130 or in error monitoring dedicated registers 140 to allow higher-level software to determine the cause of the reset.

Error monitoring module 110 can process the error by communicating with other processing modules 105. Error monitoring module 110 can process the error by notifying the other processing module (s) 105 of the error. In one embodiment, error monitoring module 110 notifies the other processing module(s) 105 of the error by forcing each of the other processing module(s) 105 to the error monitoring state. In one embodiment, error monitoring module 110 communicates with an error monitoring module 110 in the other processing module(s) 105. In an alternate embodiment, error monitoring module 110 communicates with another module (not shown) in the other processing module(s) 105. Error monitoring module 110 can communicate with other processing modules 105 by sending or receiving a coherency instruction or coherency message. For example, error monitoring module 110 can send a coherency instruction to another processing module 105 to stop, send a coherency instruction to another processing module 105 to pause and report its state to error monitoring module 110, send a response to another processing module 105 based on information (e.g., state) received from the another processing module 105, receive a coherency instruction from another processing module 105 to stop, receive a coherency instruction from another processing module 105 for the error monitoring module 110 to stop, receive a coherency instruction from another processing module 105 for processing module 105 to stop, send a coherency instruction that error monitoring module 110 has stopped, etc. Error monitoring module 110 can send or receive the coherency instruction by communicating with the other processing modules using special transactions on a coherency bus (not shown), via a network (not shown), by setting a flag in error monitoring dedicated registers 140, by setting a flag in on-die memory 120, by setting a flag in off-die memory 150, by setting a flag in error protected memory 155, etc.

Error monitoring module 110 can process the error by determining whether to resume execution of the software component 130 that encountered the error.

Error monitoring module 110 can determine information associated with the error to provide to a software component 130, such as an operating system, a virtual machine manager, etc. The information associated with the error can be stored in a predefined format in a predefined memory location, such as in on-die memory 120, error monitoring dedicated registers 140, or off-die memory 150.

Figure 2:
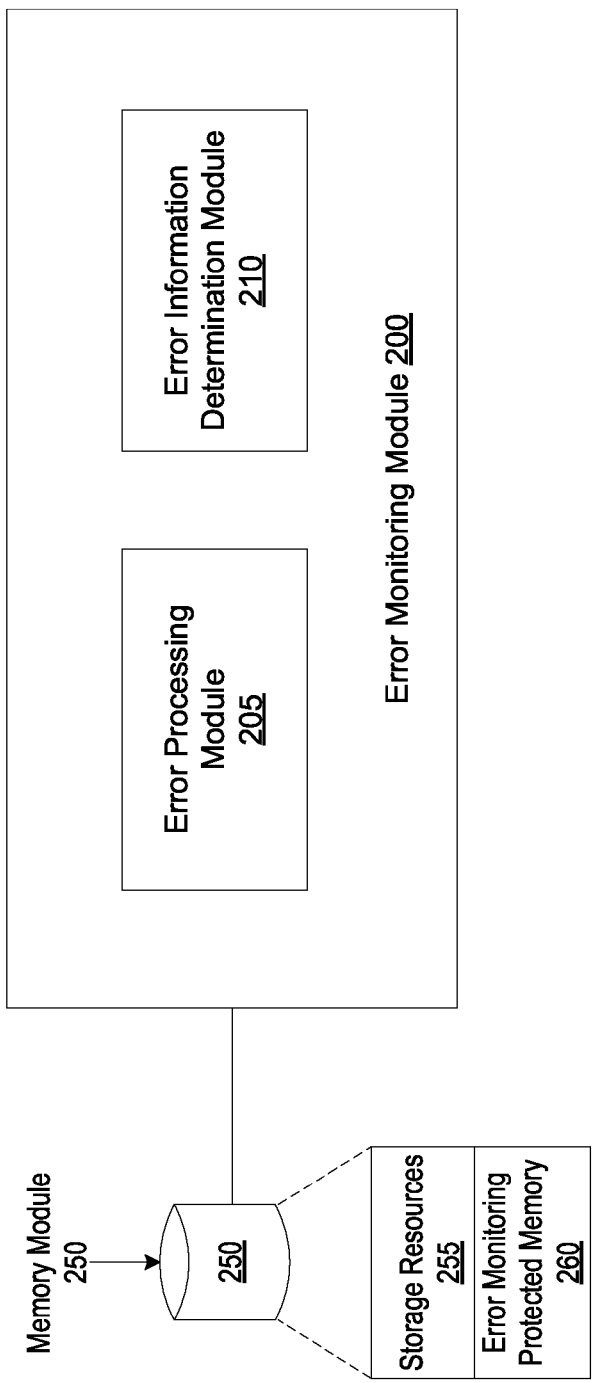
FIG. 2 is a block diagram illustrating an error monitoring module to implement the machine check architecture execution environment according to an embodiment of the disclosure.

FIG. 2 illustrates an error monitoring module 200 to implement a machine check architecture environment, in accordance with one embodiment of the present disclosure. In one embodiment, the error monitoring module 200 is the same as the error monitoring module 110 described above with respect to FIG. 1. The error monitoring module 200 may include an error processing module 205 and an error information determination module 210. More or less components may be included in the error monitoring module 200 without loss of generality.

Error processing module 205 can obtain an occurrence of an error. Upon obtaining the occurrence of the error, error processing module 205 can place a computing system into an error monitoring state by executing code in an error monitoring protected memory, such as error monitoring protected memory 260 in memory module 250. Error processing module 205 can process the error by modifying the execution of instructions, allowing one or more security policies to be violated, determining if corrected data can be obtained, forcing a reset, communicating with other processing modules (not shown) or error monitoring modules (not shown), determining whether to resume execution of the software component, etc.

If a fault, error, or interrupt is suppressed by error processing module 205, error processing module 205 can store the fault, error, or interrupt, or a flag corresponding to a fault, error, or interrupt to memory, such as storage resources 255 in memory module 250. If a security policy is violated, error processing module 205 can store the security policy, or a flag corresponding to the security policy to memory, such as storage resources 255 in memory module 250. Error processing module 205 can determine if corrected data can be obtained by accessing a predefined location in a memory, such as storage resources 255 in memory module 250.

Error processing module 205 can determine whether to force a reset of a computing system (not shown) based on the occurrence of the error. In one embodiment, error processing module 205 determines whether to force a reset of the computing system by determining if the error prevents further execution of instructions by the computing system. For example, error processing module 205 may determine that the error prevents further execution of instructions (e.g., execution cannot proceed) if corrected data cannot be obtained. If error processing module 205 determines that the error prevents further execution of instructions, error monitoring module 205 can force a reset of the computing system. Prior to forcing a reset, error processing module 205 can cause error information determination module 210 to set a flag or store information related to the reason for the reset and set a flag or store information related to the error in memory, such as error monitoring protected memory 260 in memory module 250 to allow higher-level software to determine the cause of the reset.

Error processing module 205 can communicate with other processing modules by sending or receiving a coherency instruction. The coherency instruction can instruct another processing module to stop, can instruct another processing module to pause and report its state to error processing module 205, can be a response to another processing module based on information (e.g., state) received from the another processing module, can be an instruction to error processing module 205 to stop, can be a message that error processing module 205 has stopped, etc. In some embodiments, error processing module 205 sends or receives the coherency instruction by setting a flag in memory, such as storage resources 255 in memory module 250.

Error information determination module 210 can determine information associated with the error to provide to a software component (not shown), such as an operating system, a virtual machine manager, etc. The information associated with the error can be stored in a predefined format in a data structure in memory, such as in storage resources 255 in memory 250.

Figure 3:
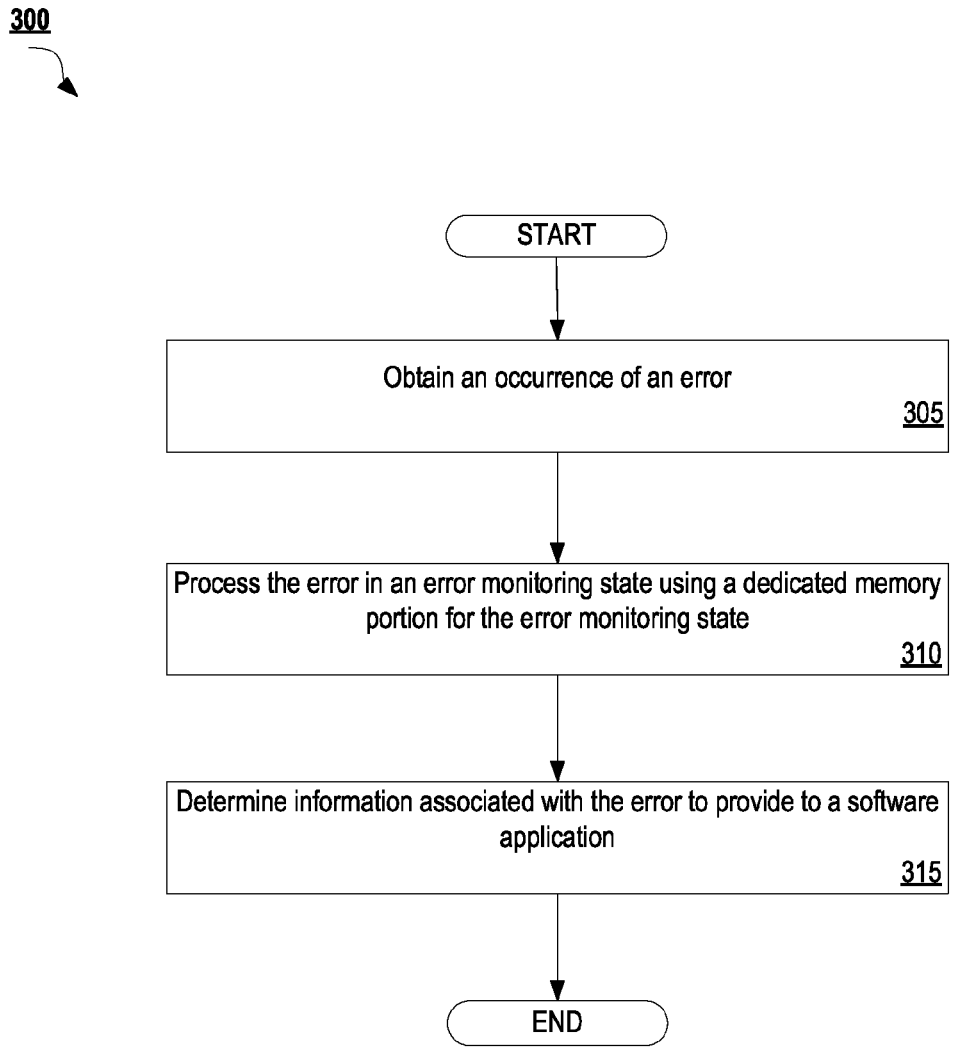
FIG. 3 is a flow diagram illustrating a method for a machine check architecture execution environment according to an embodiment of the disclosure.

FIG. 3 is a flow diagram of a method 300 for a machine check architecture environment according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by device 100 described with respect to FIG. 1.

At block 305, processing logic obtains an occurrence of an error. The error can be a soft error, a hard error, etc. A soft error can change an instruction or a data value in memory of a computing system. The soft error may not damage the hardware of the computing system, the only damage is to the data that is being processed by the computing system. The soft error can occur due to a radioactive atom in the material of the computing system decays and releases alpha particles into the computing system or can occur when the data is hit with a noise phenomenon from other electrical events on the computing system, from power, or from other nearby devices, such as when the data is on a data bus. A hard error can be caused by an error in the hardware of the computing system that is permanent. In one embodiment, processing logic obtains the occurrence of the error from an application or program in which the error occurred. In an alternate embodiment, processing logic obtains the occurrence of the error from a dedicated storage location (e.g., memory location, register, etc.) that stores the occurrence of the error. The dedicated storage location can be protected and dedicated to an error monitoring state and may not be accessed or modified. Hardware in the computing system can prevent access to the dedicated storage location by software applications, programs, input/output devices, etc. In some embodiments, processing logic stores the instruction that encountered the error upon detecting the occurrence of the error. In some embodiments, if the instruction that encountered the error is not stored, processing logic stores the address of the instruction that was running when the error occurred or was detected.

At block 310, processing logic processes the error in an error monitoring state using a dedicated memory portion. To process the error in the error monitoring state, processing logic can modify the execution of instructions in the computing system to suppress any faults, errors, or interrupts in the computing system. Processing logic can suppress the faults, errors, or interrupts in the computing system by setting a corresponding flag. For example, the dedicated memory portion can include a fault suppress flag, an error suppress flag, and/or an interrupt suppress flag. If a fault is suppressed, the fault suppress flag is set to a predefined value, such as 1. Processing logic or other processing devices can use the flags later during processing the error to analyze whether any faults, errors, or interrupts occurred while processing the error. By suppressing faults, interrupts, and/or additional errors, processing logic can analyze the error to get information about the error without requiring the processing logic to stop to handle the faults, interrupts, and/or additional errors. In addition, processing logic can check the fault suppress flag, the error suppress flag, and/or the interrupt suppress flag and if any of the flags are set, processing logic can ignore any additional errors. Thus, processing logic will avoid allowing additional errors in the computing system. Moreover, because the hardware in the computing system may be unsafe and the computing system may be considered unstable because of the current error, the processing of the faults, interrupts, or additional errors may not be safe for the computing system. Therefore, the processing logic processes the error in the error monitoring state differently than processing the error in another execution state (e.g., regular or normal execution state).

To process the error in the error monitoring state, processing logic can modify the execution of instructions in the computing system to allow one or more security policies to be violated. A security policy can be associated with memory, and can permit or deny access to the memory. For example, a security policy allows certain memory addresses to be read (e.g., read permission), other memory addresses to be read or written (e.g., read/write permission), and some memory addresses to be inaccessible to any software programs or applications. While in the error monitoring state, processing logic can violate the security policy, such as by writing to memory that does not have write permission, reading memory that does not have read permission, etc. By allowing one or more security policies to be violated while in the error monitoring state, the processing logic can have access to any information that the processing logic may need to gather information about the error. For example, processing logic can violate the security policy in order to read the address information of the instruction that encountered the error, as well as to read the address information of all memory addresses that accessed the memory that encountered the error. In another example, if the error is detected in a cache, processing logic can violate the security policy of the cache (which may not be readable) to read the physical line and set information in order to track a history of errors to specific entries in the cache. Upon allowing a security policy to be violated, processing logic can set a security policy violation flag to a predefined value, such as 1. Processing logic or other processing devices can use the security policy violation flag later during processing the error to analyze whether any security policies were violated while processing the error. By allowing one or more security policies to be violated, processing logic can analyze the error to get information about the error without requiring the processing logic to stop due to security policy violations. In addition, processing logic can check whether the security policy violation flag is set while in the error monitoring state in order to avoid causing additional errors in the computing system.

To process the error in the error monitoring state, processing logic can cause a hardware operation to be performed to test the operation of hardware associated with the error. Processing logic can cause the hardware operation to be performed by initiating a dedicated state machine to test operation of the hardware. For example, the dedicated state machine can test a cache or memory. In one embodiment, processing logic obtains data from the hardware operation (e.g., from a memory, registers, etc.) to determine whether the error was repeated when the operation of the hardware was performed. Processing logic can determine whether the error was repeated by accessing one or more error registers, memory, etc. that store error information. In one embodiment, if processing logic determines that the error was repeated, processing logic can determined that the error is not recoverable. Processing logic can obtain data from the hardware operation to determine other information about the error, the computing system, etc.

To process the error in the error monitoring state, processing logic can determine if the error is a hard error and whether the hardware error is recoverable. Processing logic can determine that the error is a hard error by determining if the error is a hardware error (e.g., accessing a register storing the type of error). Processing logic can determine whether the hardware error is recoverable by determining whether the hardware affected by the hardware error can be adjusted based on the hardware error. For example, if the hardware error is caused by a wire in a bus or link that has a hard fault, the wire can be eliminated from the bus or link. In this example, the width of the bus or link can be reduced (e.g., half width) to eliminate the wire that has the hard fault and allow data to be correctly sent over the reduced width bus or link. In this example, by reducing the bus or link to no longer include the wire that has the hard fault, processing logic can recover from the hardware error.

To process the error in the error monitoring state, processing logic can determine if corrected data to correct the error can be obtained from another memory, another processing device, etc. For example, if a memory location associated with the error contains a copy of data from another location on another processor, processing logic determines that the corrected data can be obtained and requests or obtains the copy of the corrected data. If processing logic determines that corrected data can be obtained, processing logic can obtain the corrected data by accessing (e.g., reading) the corrected data from a predefined location, such as a predefined memory address, a predefined internal processor register, a predefined storage resource, etc. In some embodiments, processing logic further passes control to higher-level software if the corrected data can be obtained.

To process the error in the error monitoring state, processing logic can force a reset the computing system if the computing system cannot minimally recover from the error. The processing logic can determine whether the computing system can minimally recover from the error using various implementations known in the art. In one embodiment, processing logic determines whether to force a reset of the computing system by determining if the error prevents further execution of instructions. For example, processing logic determines that the error prevents further execution of instructions (e.g., execution cannot proceed) if corrected data cannot be obtained. If processing logic determines that the error prevents further execution of instructions, processing logic can force a reset of the computing system. Once processing logic has determined that the computing system cannot minimally recover from the error (e.g., if the error prevents further execution of instructions), processing logic can store or place information related to the reason for the reset and the error in a predefined region of memory or a dedicated machine register, such that higher level software can access the specific region of memory or dedicated machine register after the computing system has been reset and determine the cause for the reset. In one embodiment, the dedicated machine register is a severity register that stores the severity of the error that forced the reset.

To process the error in the error monitoring state, processing logic can execute one or more coherency instructions to communicate with processing devices (e.g., cores) other than the processing device executing the processing logic. In one embodiment, the coherency instruction is an instruction to a processing device to stop. In one embodiment, processing logic sends the coherency instruction to a processing device to instruct the processing device to stop execution with the lowest possible latency. In an alternate embodiment, processing logic sends the coherency instruction to a processing device to instruct the processing device to enter an error monitoring state such that the processing device is ready to receive messages from the processing logic. In another embodiment, processing logic sends a coherency instruction to a processing device to pause and report its state to processing logic. In another alternate embodiment, processing logic sends a response to the processing based on information (e.g., state) received from the processing device.

The processing device can be a processing device on the same die as the processing logic or a processing device on a different die than the processing logic. Processing logic can issue the coherency instruction to the processing device to instruct the processing device in response to determining that the error is not recoverable and requires the computing system to be reset. Processing logic can issue the coherency instruction to the processing device to in response to determining that the error was associated with the processing device and that the processing device should be stopped or execute in an error monitoring state to process the error. Processing logic can wait to receive an instruction or message from the processing device. Processing logic can wait to receive the instruction or message in response to sending the coherency instruction to the processing device. The instruction or message from the processing device can indicate to processing logic that the processing device is in control of its execution state and may be trying to recover from an error or may indicate to processing logic that the error caused corrupted data and/or that the processing device recorded the error. The error can be the same error that the processing logic is processing or a different error than the error that the processing logic is processing. By waiting for the processing device to send an instruction or message, the processing logic can be aware that the processing device may need the processing logic to execute instructions or take actions to assist the other processing device (e.g., assist the processing device to recover from the same error, assist the processing device to recover from a different error, etc.). Processing logic can execute the instructions or take actions upon receiving the instructions or actions from the processing device.

In one embodiment, the coherency instruction is a message or indication to the processing device and other processing devices that the processing device executing the processing logic has stopped and awaits resolution of the error. In one embodiment, processing logic sends the coherency message over a coherency network to inform the processing devices that the processing device executing the processing logic has stopped. In an alternate embodiment, processing logic sets a stop flag in a dedicated region of shared protected memory. In one embodiment, the dedicated region of shared protected memory stores a flag for each processing device in the computing system. In an alternate embodiment, the dedicated region of shared protected memory stores a stop flag and a location for identification information of the processing device that has stopped. For example, if processing device 0x1100 has stopped, the processing logic associated with processing device 0x1100 sets the stop flag to a positive value (e.g., 1) and stores the identification information 0x1100 such that processing devices can access the dedicated region of shared protected memory and read this information.

In one embodiment, if the error is a coherency link fault between the processing device executing the processing logic and another processing device, processing logic sends a coherency message to the another processing device that the coherency link fault has occurred and waits for the another processing device to respond to the coherency message.

To process the error in the error monitoring state, processing logic can determine whether to resume execution of the software application or program in which the error was encountered or triggered. To determine whether to resume execution, processing logic can determine if the error modified a machine execution result associated with the software application or program. If the error did not modify the machine execution result, processing logic can determine that the software application or program can resume execution. Processing logic can determine if the error modified a machine execution result based on a type or a cause of the error. For example, the error may not modify the machine execution result if the error was caused by a speculative data fetch or speculative branch instruction, if the error was due to detecting a bad memory location by a hardware memory scanner when the location was not part of the software application or program that was running, if the error was due to a bad signal on a coherency link, etc. If the error did modify the machine execution result, processing logic can determine that the software application or program cannot resume execution. If processing logic determines that the software application or program can resume execution, processing logic can return control to the software application or program and allow the software application or program to resume execution. Processing logic can return control to the software application or program by passing control to an operating system with the return address to the operating system being the address of the software application or program. If processing logic determines that the software application or program cannot resume execution, processing logic can determine if the computing system can recover from the error. Processing logic can determine whether the computing system can recover from the error using various implementations known in the art. In one embodiment, processing logic determines whether the computing system can recover from the error by determining if the error prevents further execution of instructions in the computing system. For example, processing logic determines that the error prevents further execution of instructions (e.g., execution cannot proceed) if corrected data associated with the error cannot be obtained. If processing logic determines that the error prevents further execution of instructions in the computing system, processing logic can determine that the computing system cannot recover from the error. If processing logic determines that the error does not prevent further execution of instructions, processing logic can determine that the computing system can recover from the error.

If processing logic determines that the computing system cannot recover from the error, processing logic can force a reset of the computing system. If processing logic determines that the computing system can recover from the error, processing logic can pass control to an operating system or virtual machine manager to cause the operating system or virtual machine manager to handle the error. Prior to forcing a reset of the computing system or passing control to the operating system or virtual machine manager, processing logic can store information about the error.

To process the error in the error monitoring state, processing logic can determine whether multiple errors were reported after the initial error. Processing logic can determine whether multiple errors were reported after the initial error by saving (e.g., storing) a first occurrence of an error that occurred after the initial error and saving information that additional errors occurred (e.g., without storing the occurrence of each error).

In some embodiments, processing logic can store the information obtained from processing the error in a queue of error information that can be processed as a group. In some embodiments, processing logic can add or store additional information to the queue of error information while the queue of error information is being processed by other processing devices. In some embodiments, a semaphore is used to manage consistency of the queue.

At block 315, processing logic can determine information associated with the error. The information associated with the error is determined and created in a predefined format. The information associated with the error can include one or more addresses, whether the error is recoverable or not recoverable, a reason for a reset if the error is a severe error, etc. The predefined format can be required by software, such as an operating system or a virtual machine manager. The predefined format can include an error identification, an error status, a physical instruction address, a logical instruction address, a physical data address, a logical data address, a hardware register identification value, an incorrect data value, etc. In some embodiments, the predefined format is stored in a memory location using a data structure including the predefined format. For example, the predefined format is illustrated below in reference to Table 1.

TABLE 1

Error Identification
Error Status
Physical Instruction Address
Logical Instruction Address
Physical Data Address
Logical Data Address
Hardware Register Identification
Incorrect Data In one embodiment, processing logic determines information associated with the error by accessing (e.g., reading) the address of the instruction that encountered the error. In one embodiment, if the address of the instruction that encountered the error is not available (e.g., was not stored in hardware because the address that encountered the error is unknown), processing logic accesses the address of the instruction running when the error was detected. The address can be stored in hardware, in a cache, in memory, or in other storage. In one embodiment, the address is stored in dedicated hardware only accessible during the error monitoring state. In one embodiment, processing logic determines information associated with the error by accessing (e.g., reading) the address of the instruction being executed when the error was detected and the memory address of any memory transaction being performed. In one embodiment, processing logic accesses the address in a special machine registered that is only accessible by the processing logic only in the error monitoring state.

In one embodiment, processing logic determines information associated with the error by accessing (e.g., reading) additional memory addresses of memory accesses that encountered the error. The additional memory addresses can be stored in hardware, in a cache, in memory, or in other storage. In one embodiment, the address is stored in dedicated hardware only accessible during the error monitoring state. Upon determining that the processed error was in a cache, processing logic can determine information associated with the error by accessing physical line and set information from the cache. Using the physical line and set information from the cache can allow the processing logic, the software application, or the program to determine or track a history of errors to specific cache entries. Processing logic can access the physical line and set information directly from the cache or from a memory or storage that stores this information.

Processing logic can determine information associated with the error based on the processing of the error in the error monitoring state. Processing logic can obtain data from storage associated with the hardware operation performed to test the operation of hardware associated with the error. For example, processing logic can read data generated by a hardware state machine if the hardware state machine was initiated to perform a test on hardware associated with the error. The data can be obtained from a cache, memory, etc.

Processing logic can determine information associated with the error by accessing memory and/or internal processor registers to obtain corrected data. The corrected data may be stored in the information to be provided to the software application for use by the software application.

Processing logic can determine information associated with the error by accessing specific hardware or storage in which the error was triggered or encountered. For example, if the error occurred while accessing memory, processing logic will access the storage to obtain a physical address to identify the sources of the error and any additional data available, such as whether multiple entries caused the error.

Processing logic can determine information associated with the error by determining the type of error. Processing logic can determine the type of error by accessing the type of error in process or register flags in registers that are dedicated to the error monitoring state. For example, the type of error can be a bad parity, a bad error correction code (ECC), a corrected ECC, an invalid response from device, an error detected in a state machine, an incorrect result from a computation unit (e.g., ALU), etc.

Processing logic can determine information associated with the error by storing information about whether the software application or program that encountered or triggered the error resumed execution (e.g., the error was corrected).

In one embodiment, once the determined information associated with the error has been created in the predefined format, processing logic stores the determined information in a data structure in a region of memory that belongs to higher level software, such as an operating system or a virtual machine manager. An example of the data structure is illustrated above in Table 1. In one embodiment, processing logic identifies the region of memory storing the determined information in a dedicated register or memory location.

In some embodiments, processing logic optionally resumes execution of the software application or program that encountered the error upon determining information associated with the error. In these embodiments, processing logic resumes execution of the program if the error is recoverable once the processing logic has stored the information associated with the error such that other progressing devices can use this information to manage the overall health of the computing system. In these embodiments, processing logic instructs the other processing devices to resume execution by sending an instruction to each of the processing devices to resume execution in an execution state other than the error monitoring state.

Figure 4A:
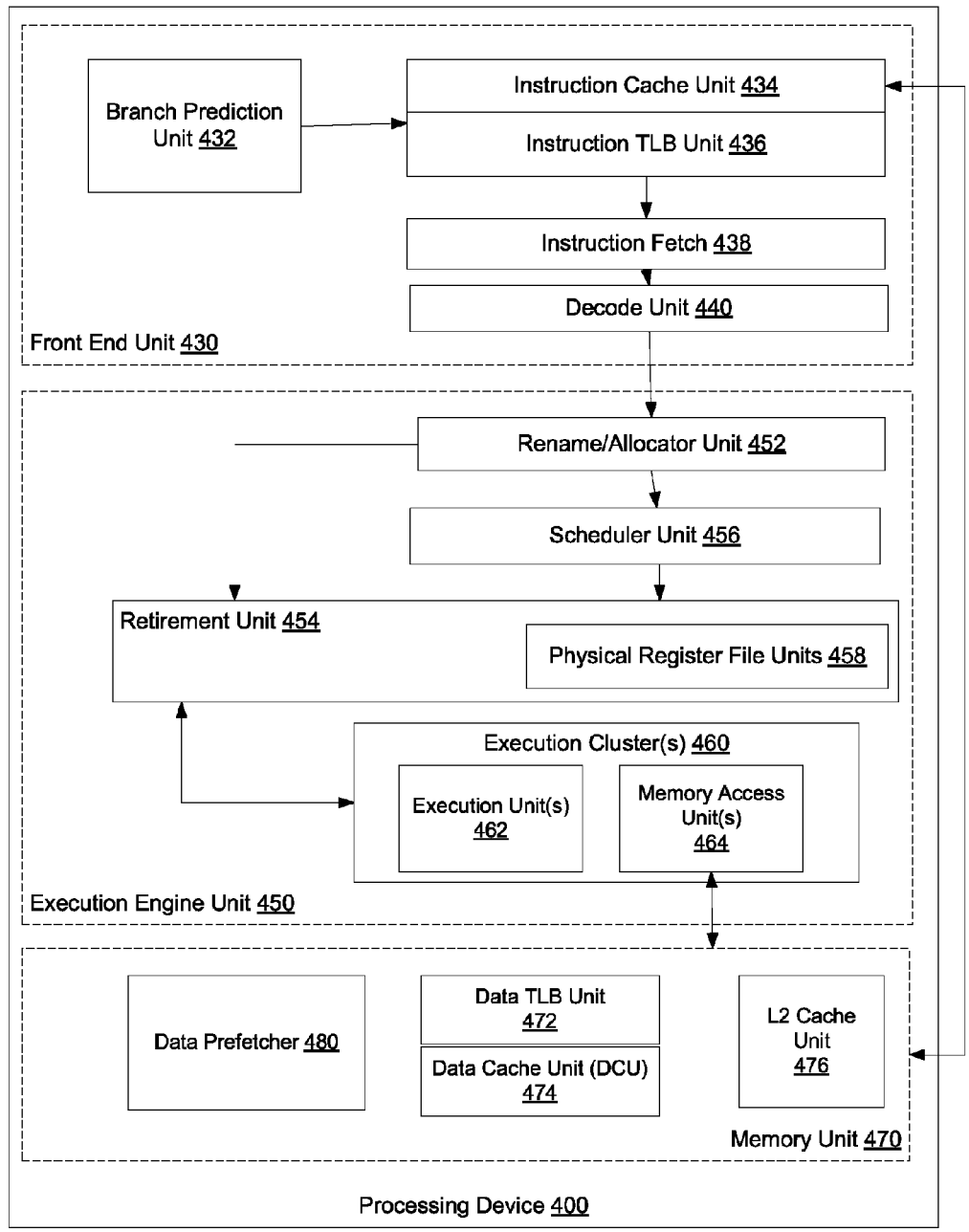
FIG. 4A is a block diagram illustrating a micro-architecture for a processor that implements minimizing bandwidth to track return targets by an ITS in which one embodiment of the disclosure may be used.

FIG. 4A is a block diagram illustrating a micro-architecture for a processor 400 that implements a machine check architecture environment in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
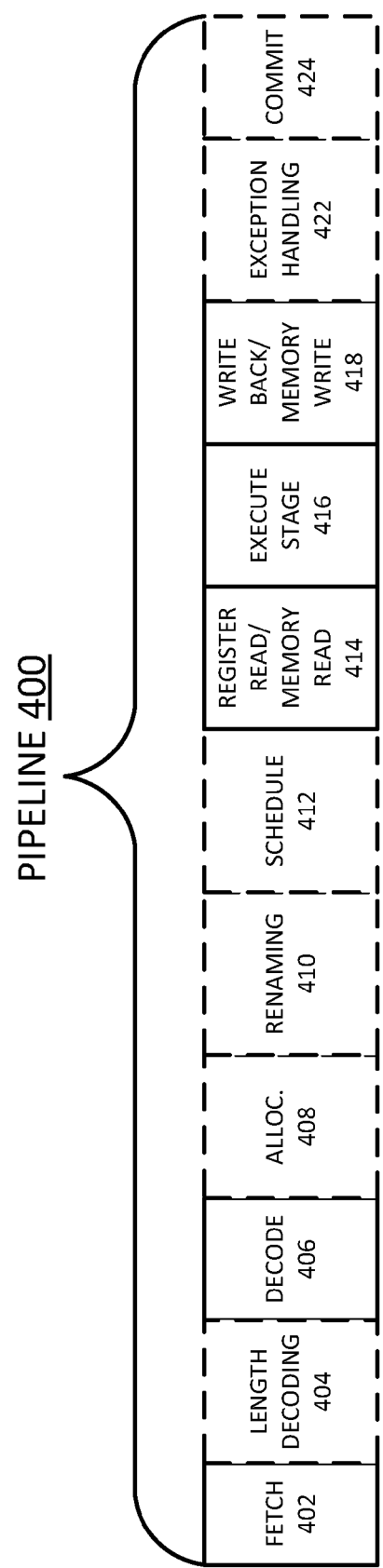
FIG. 4B is a block diagram illustrating an in-order pipeline and a register renaming stage, out-of-order issue/execution pipeline implemented according to at least one embodiment of the disclosure.

FIG. 4B is a block diagram illustrating an in-order pipeline and a register renaming stage, out-of-order issue/execution pipeline implemented by processing device 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
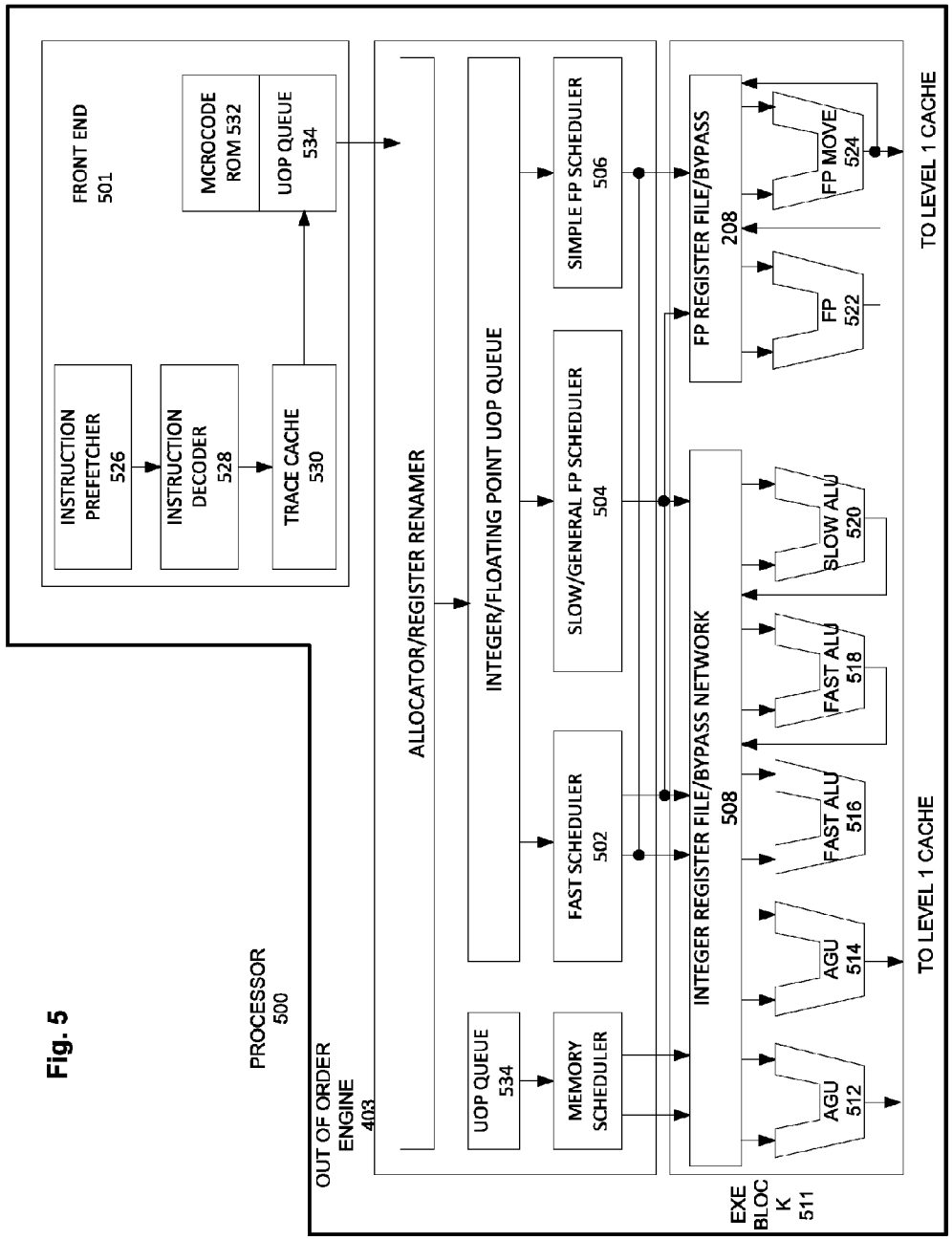
FIG. 5 illustrates a block diagram of the micro-architecture for a processor that includes logic circuits to perform minimizing bandwidth to track return targets by an ITS in accordance with one embodiment of the disclosure.

FIG. 5 illustrates a block diagram of the micro-architecture for a processor 500 that includes logic circuits to implement a machine check architecture environment in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to a entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement a machine check architecture environment according to embodiments of the disclosure. In one embodiment, the execution block 511 of processor 500 may include an error monitoring module, such as an a machine check architecture environment, to implement a machine check architecture environment according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
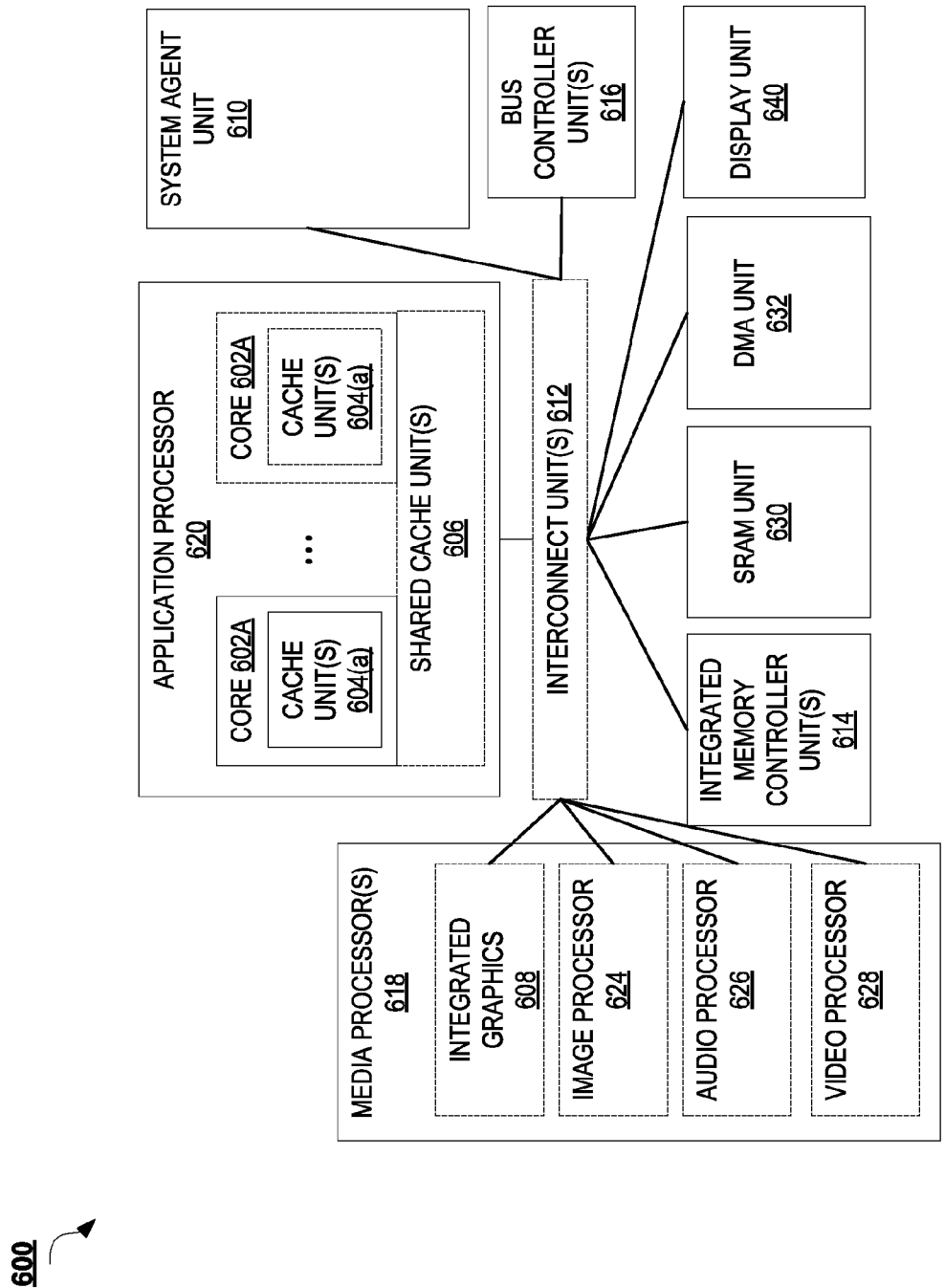
FIG. 6 is a block diagram of a computer system according to an embodiment of the disclosure.

FIG. 6 is a block diagram of a SoC 600 that includes logic circuits to implement a machine check architecture environment in accordance with an embodiment of the present disclosure. Dashed lined boxes are optional features on more advanced SoCs. In FIG. 6, an interconnect unit(s) 612 is coupled to: an application processor 620 which includes a set of one or more cores 602A-N and shared cache unit(s) 606; a system agent unit 610; a bus controller unit(s) 616; an integrated memory controller unit(s) 614; a set or one or more media processors 618 which may include integrated graphics logic 608, an image processor 624 for providing still and/or video camera functionality, an audio processor 626 for providing hardware audio acceleration, and a video processor 628 for providing video encode/decode acceleration; an static random access memory (SRAM) unit 630; a direct memory access (DMA) unit 632; and a display unit 640 for coupling to one or more external displays.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof.

In some embodiments, one or more of the cores 602A-N are capable of multi-threading.

The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture and/or instruction set. For example, some of the cores 602A-N may be in order while others are out-of-order. As another example, two or more of the cores 602A-N may be capable of execution the same instruction set, while others may be capable of executing only a subset of that instruction set or a different instruction set.

The application processor 620 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 620 may be from another company, such as ARM Holdings, Ltd, MIPS, etc. The application processor 620 may be a special-purpose processor, such as, for example, a network or communication processor, compression engine, graphics processor, co-processor, embedded processor, or the like. The application processor 620 may be implemented on one or more chips. The application processor 620 may be a part of and/or may be implemented on one or more substrates using any of a number of process technologies, such as, for example, BiCMOS, CMOS, or NMOS.

In one embodiment, the application processor 620 is a non-microcoded processor that also includes logic to implement a machine check architecture environment according to embodiments of the present invention. For example, the application processor 620 may include logic to execute an error monitoring module, such as error monitoring module 110 described with respect to FIG. 1, where the error monitoring module 110 can obtain an occurrence of an error, process the error in an error monitoring state using a dedicated memory portion, and determine information associated with the error to provide in a predefined format to a software application. The error monitoring module 110 can further communicate with other application processors (not shown) by sending or receiving coherency instructions or coherency messages. Processing the error in the error monitoring state process the error differently than processing the error in another execution state.

Figure 7:
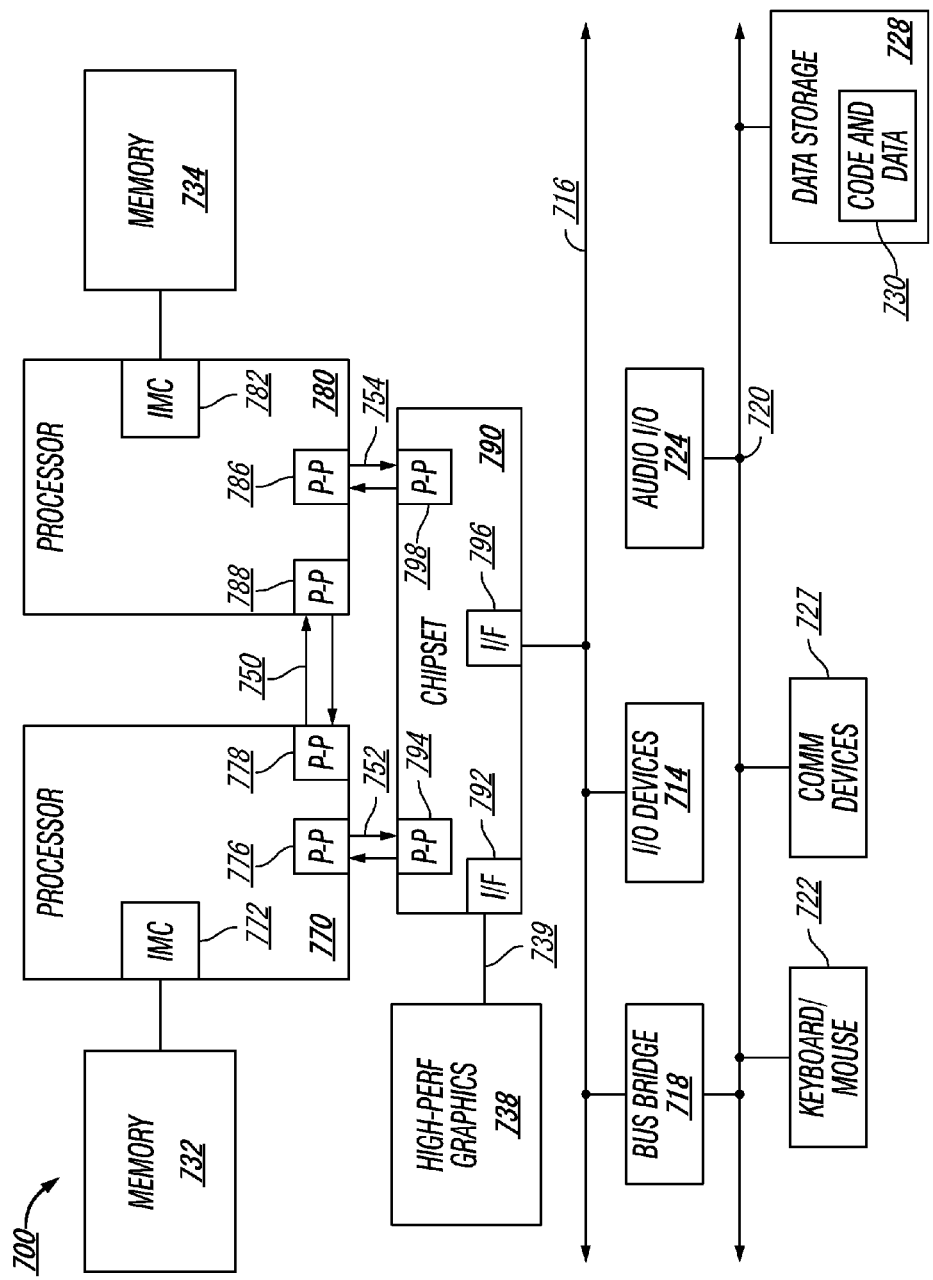
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement minimizing bandwidth to track return targets as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement a machine check architecture environment as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
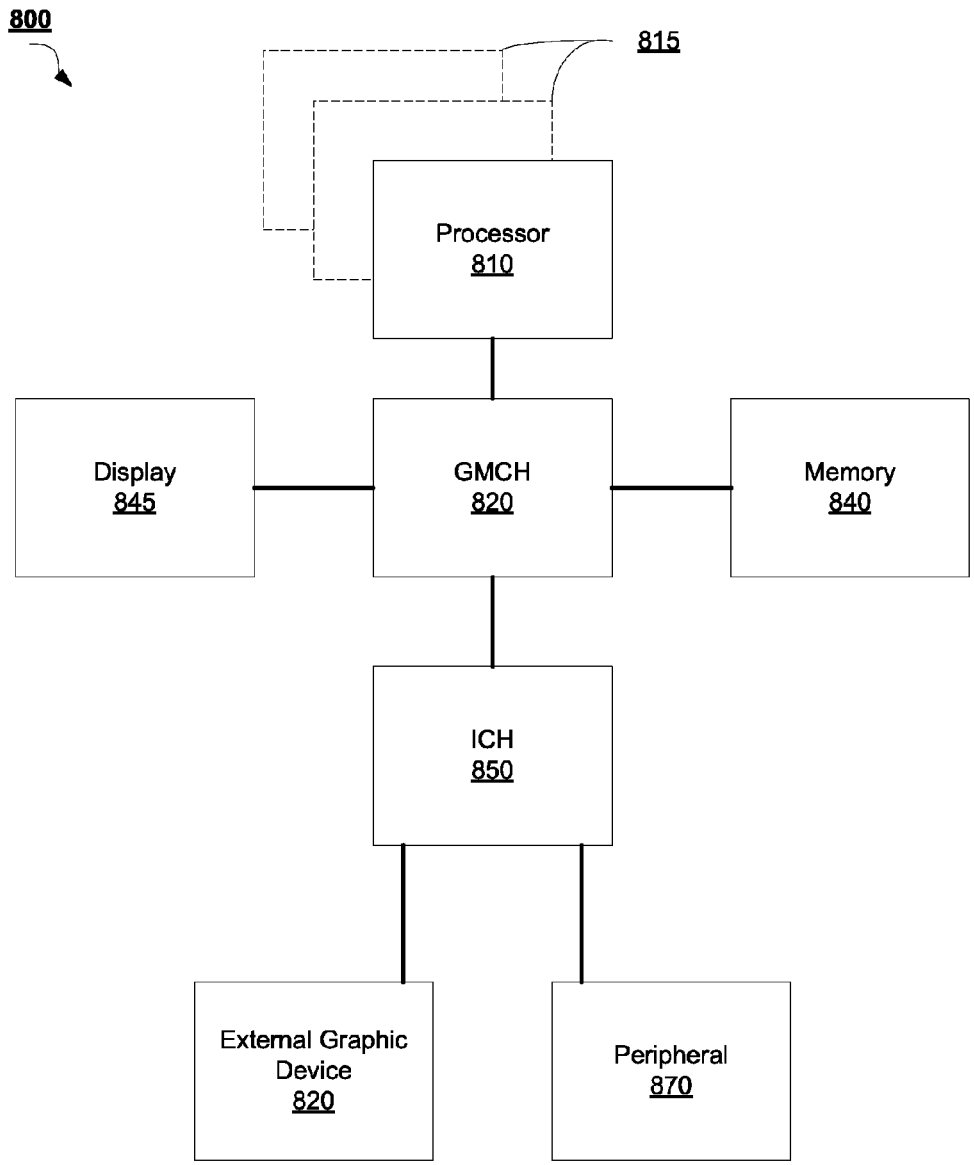
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement a machine check architecture environment according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
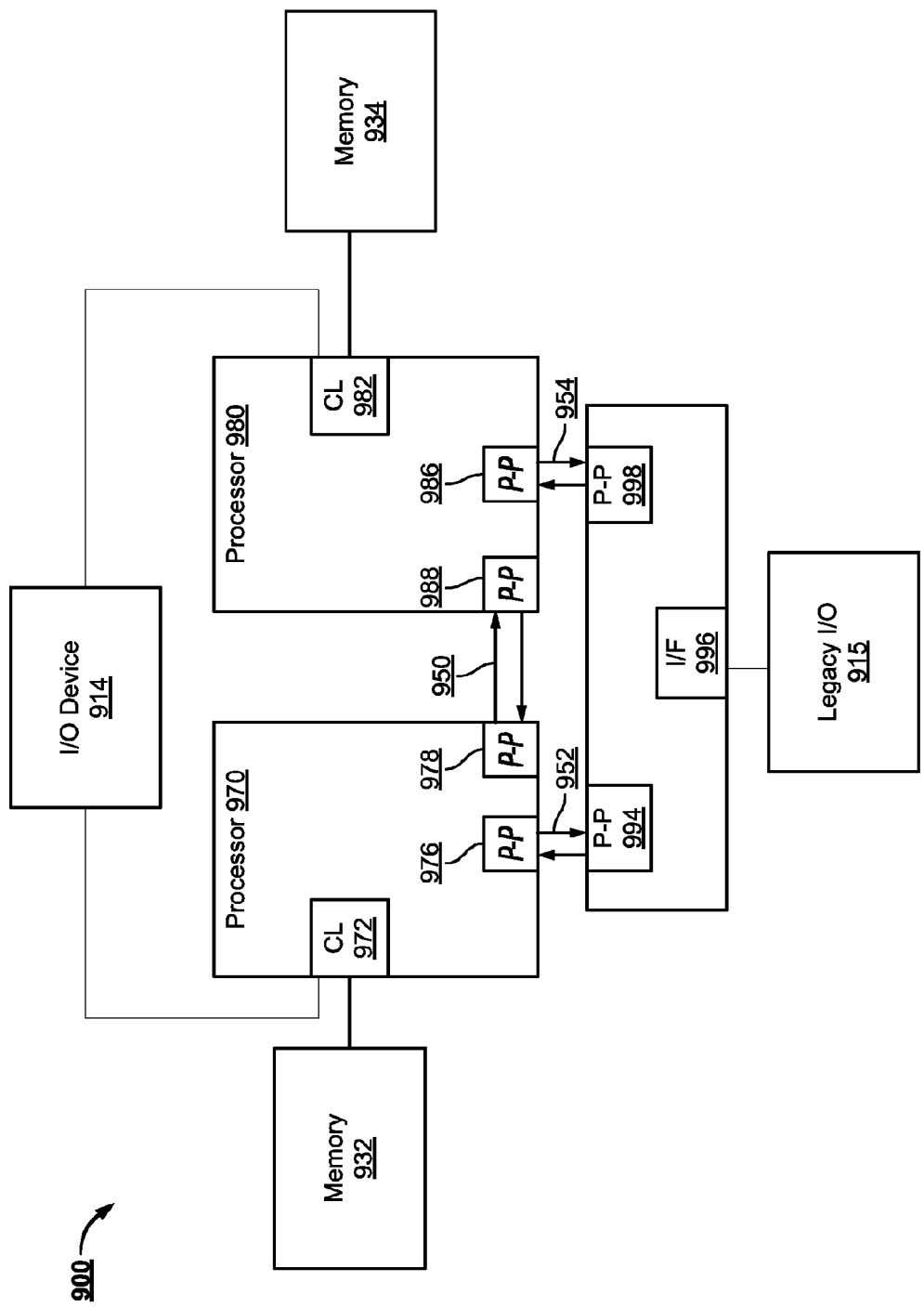
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement minimizing bandwidth to track return targets as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
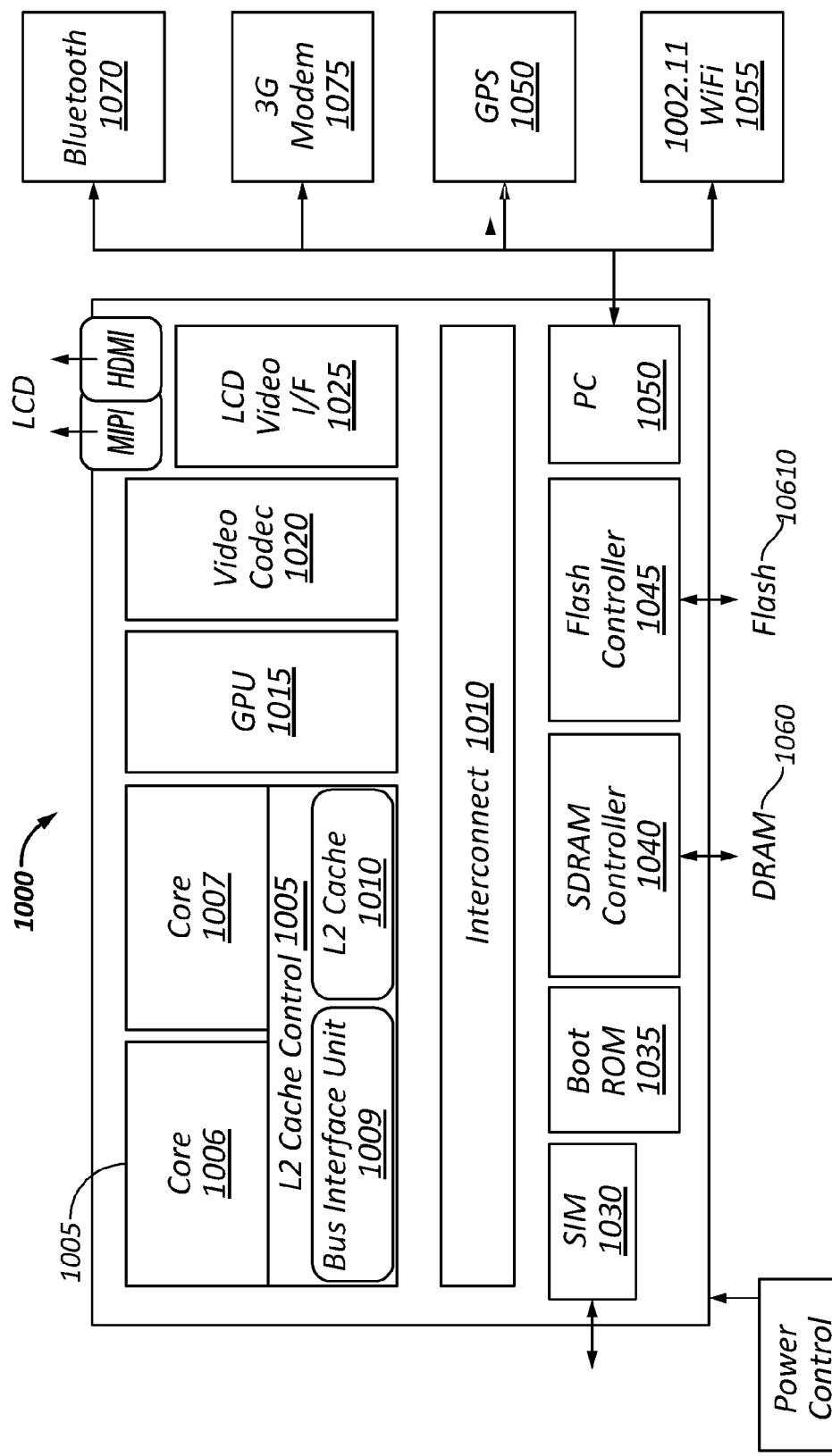
FIG. 10 is a block diagram of a computing system according to another embodiment of the disclosure.

FIG. 10 is a block diagram of an embodiment of a system on-chip (SOC) design in accordance with the present disclosure. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure.

Interface 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein.

In one embodiment, the cores 1006 and 1007 also include logic to implement a machine check architecture according to embodiments of the present invention. For example, the cores 1006 and 1007 may include logic to execute an error monitoring module, such as error monitoring module 110 described with respect to FIG. 1, where the error monitoring module 110 can obtain an occurrence of an error, process the error in an error monitoring state using a dedicated memory portion, and determine information associated with the error to provide in a predefined format. Processing the error in the error monitoring state process the error differently than processing the error in another execution state.

In addition, the system 1000 illustrates peripherals for communication, such as a Bluetooth module 1070, 3G modem 1075, GPS 1080, and WiFi 1085. Note as stated above, a UE includes a radio for communication. As a result, these peripheral communication modules are not all required. However, in a UE, some form a radio for external communication is to be included.

Figure 11:
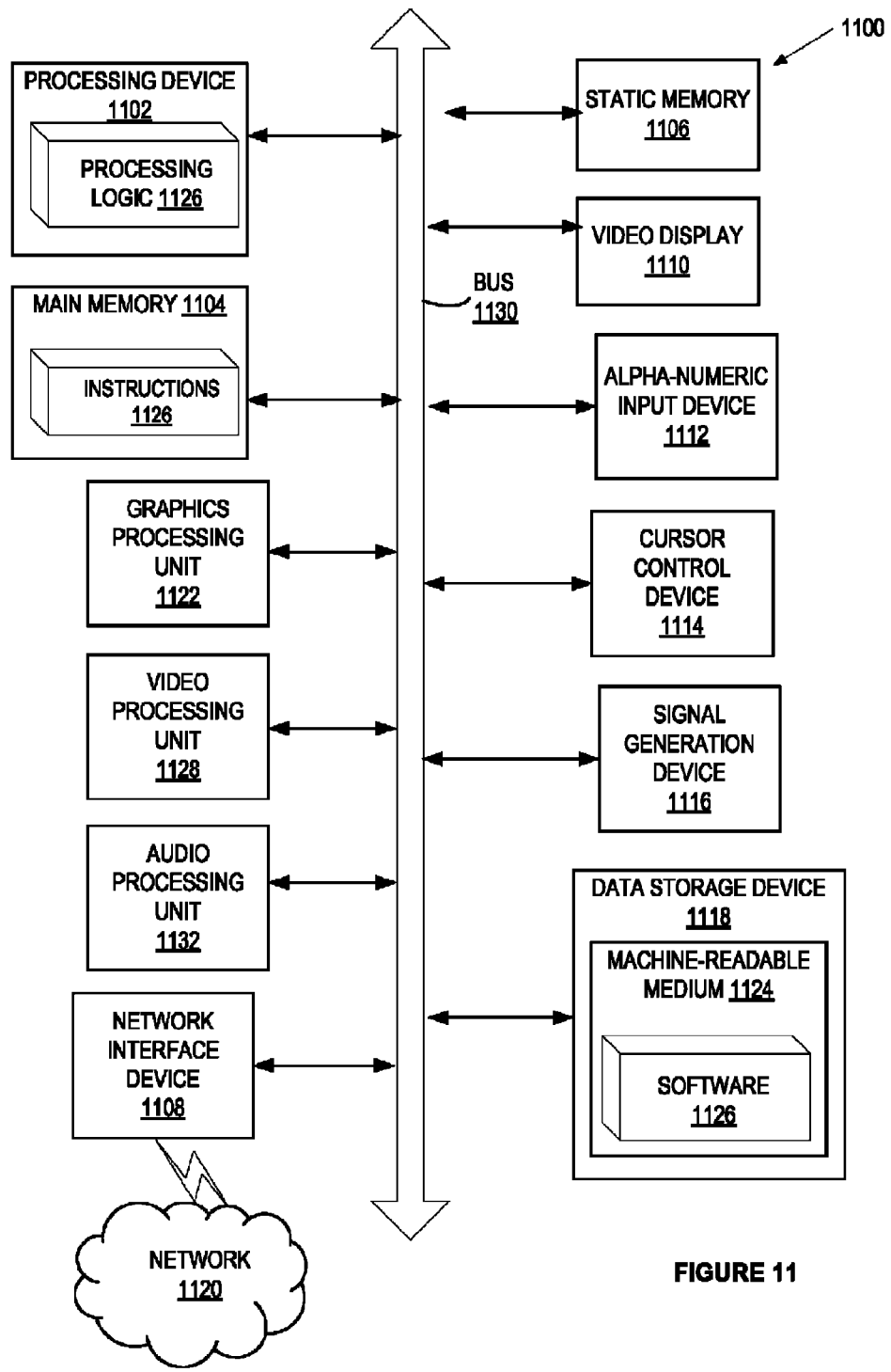
FIG. 11 is a block diagram of a computing system according to another embodiment of the disclosure.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations and steps discussed herein. In one embodiment, processing device 1102 is the same as processing device 100 described with respect to FIG. 1 that implements a generic method to build a virtual PCI device and a virtual MMIO device. For example, processing device 1102 may include a virtual device module, such as virtual device module 125 of FIG. 1.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-readable storage medium 1124 on which is stored software 1126 implementing any one or more of the methodologies of functions described herein, such as implementing a machine check architecture environment as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 implementing a machine check architecture execution environment, such as described with respect to device 100 in FIG. 1, and/or a software library containing methods that call the above applications. While the machine-readable storage medium 1124 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instruction for execution by the machine and that cause the machine to perform any one or more of the methodologies of the disclosure. The term "machine-readable storage medium" shall accordingly be taken to include, but not be limited to, solid-state memories, and optical and magnetic media.

The following examples pertain to further embodiments.

Example 1 is an apparatus comprising: 1) a memory comprising a dedicated memory portion for an error monitoring state; and 2) a non-microcoded processing device coupled to the memory, the non-microcoded processing device to obtain an occurrence of an error, the occurrence of the error causing the non-microcoded processing device to enter the error monitoring state, process the error using the dedicated memory portion while the non-microcoded processing device is in the error monitoring state, wherein the error monitoring state is dedicated to error processing, and determine information associated with the error, wherein the information associated with the error is in a predefined format.

In Example 2, to process the error in the error monitoring state, the non-microcoded processing device of Example 1 can optionally suppress the fault upon obtaining a fault, mask an additional error upon obtaining the additional error, and allow a security policy associated with the processing device to be violated.

In Example 3, to suppress the fault, the non-microcoded processing device of Example 2 can optionally set a fault suppress flag, to mask the additional error, the non-microcoded processing device of Example 2 can optionally set an error suppress flag, to allow a security policy to be violated, the non-microcoded processing device of Example 2 can optionally set a security policy violation flag, and access at least one of the fault suppress flag, the error suppress flag, or the security policy violation flag to avoid causing additional errors.

In Example 4, to determine information associated with the error, the non-microcoded processing device of Example 1 can optionally initiate a test by a hardware state machine, wherein the hardware state machine is dedicated to the error monitoring state and cannot be initiated in an execution state other than the error monitoring state and obtain data based on the test by the hardware state machine.

In Example 5, to process the error in the error monitoring state, the non-microcoded processing device of Example 1 can optionally instruct another processing device to perform at least one of: stop executing instructions, report status, or wait for resolution upon determining that the another processing device should not execute instructions.

In Example 6, to process the error in the error monitoring state, the non-microcoded processing device of Example 1 can optionally send a coherency message to another processing device, where the another processing device is in an execution state other than the error monitoring state.

In Example 7, the apparatus of Example 1 can optionally comprise a severity register indicating a severity of the error, wherein the severity register is accessible only when the non-microcoded processing device is in the error monitoring state.

In Example 8, the non-microcoded processing device of Example 1 can optionally prevent another processing device from modifying the dedicated memory portion for the error monitoring state.

In Example 9, the non-microcoded processing device of Example 1 can optionally cause a hardware operation to be performed to test operation of hardware associated with the apparatus and obtain a result of the hardware operation as the information associated with the error.

In Example 10, the non-microcoded processing device of Example 1 can optionally store the information associated with the error in a data structure in a portion of the memory dedicated to a machine check architecture.

In Example 11, the non-microcoded processing device of Example 1 can optionally determine whether to resume execution of an application that was interrupted based on the occurrence of the error, upon determining to resume execution of the application that was interrupted based on the occurrence of the error, cause the execution of the application to resume, upon determining not to resume execution of the application that was interrupted based on the occurrence of the error, determine if the apparatus can recover from the occurrence of the error, pass control to an operating system to handle the error upon determining that the apparatus can recover from the occurrence of the error, and force a reset of the apparatus upon determining that the apparatus cannot recover from the occurrence of the error.

In Example 12, the non-microcoded processing device of Example 1 can optionally process the error in the error monitoring state differently than the non-microcoded processing device processes the error in another execution state.

In Example 13, the dedicated memory portion of Example 1 can optionally comprise code for a machine check architecture.

In Example 14, the information associated with the error of Example 1 can optionally comprise at least one of: an error identification, an error status, a physical instruction address, a logical instruction address, a physical data address, a logical data address, a hardware register identification value, or an incorrect data value.

In Example 15, the non-microcoded processing device of Example 1 can optionally determine whether to resume execution of an application that was interrupted based on the occurrence of the error, upon determining to resume execution of the application that was interrupted based on the occurrence of the error, cause the execution of the application to resume, upon determining not to resume execution of the application that was interrupted based on the occurrence of the error, determine if a computing system associated with the error can recover from the occurrence of the error, pass control to an operating system to handle the error upon determining that the computing system can recover from the occurrence of the error, and force a reset of the computing system upon determining that the computing system cannot recover from the occurrence of the error.

Various embodiments may have different combinations of the operational features described above. For instance, all optional features of the apparatus described above may also be implemented with respect to a method or process described herein and specifics in the examples may be used anywhere in one or more embodiments.

Example 16 is a method for a machine check architecture execution environment for a non-microcoded processing device comprising 1) obtaining an occurrence of an error, the occurrence of the error causing the non-microcoded processing device to enter an error monitoring state, 2) processing the error using a dedicated memory portion for the error monitoring state while the non-microcoded processing device is in the error monitoring state, wherein the error monitoring state is dedicated to error processing, and 3) determine information associated with the error, wherein the information associated with the error is in a predefined format.

In Example 17, the processing the error in the error monitoring state of Example 16 can optionally comprises upon obtaining a fault, suppressing the fault, upon obtaining an additional error, masking the additional error; and allowing a security policy associated with the processing device to be violated.

In Example 18, suppressing the fault of Example 17 can optionally comprise setting a fault suppress flag, masking the additional error of Example 17 can optionally comprise setting an error suppress flag, allowing a security policy to be violated of Example 17 can optionally comprise setting a security policy violation flag, and accessing at least one of the fault suppress flag, the error suppress flag, or the security policy violation flag to avoid causing additional errors.

In Example 19, determining information associated with the error of Example 16 can optionally comprise initiating a test by a hardware state machine, wherein the hardware state machine is dedicated to the error monitoring state and cannot be initiated in the first state and obtaining data based on the test by the hardware state machine.

In Example 20, processing the error in the error monitoring state of Example 16 can optionally comprise upon determining that another processing device should not execute instructions, instructing the another processing device to perform at least one of: stop executing instructions, report status, or wait for resolution.

In Example 21, processing the error in the error monitoring state of Example 16 can optionally comprise sending a coherency message to another processing device, where the another processing device is in an execution state other than the error monitoring state.

In Example 22, processing the error monitoring state of Example 16 can optionally comprise preventing another processing device from modifying the dedicated memory portion.

In Example 23, the subject matter of Example 16 can optionally comprise causing a hardware operation to be performed to test operation of hardware associated with the error and obtaining a result of the hardware operation as the information associated with the error.

In Example 24, the subject matter of Example 16 can optionally comprise storing the information associated with the error in a data structure in a portion of the memory dedicated to a machine check architecture.

In Example 25, the subject matter of Example 16 can optionally comprise determining whether to resume execution of an application that was interrupted based on the occurrence of the error, upon determining to resume execution of the application that was interrupted based on the occurrence of the error, causing the execution of the application to resume, upon determining not to resume execution of the application that was interrupted based on the occurrence of the error, determining if a computing system associated with the error can recover from the occurrence of the error, upon determining that the computing system can recover from the occurrence of the error, pass control to an operating system to handle the error, and upon determining that the computing system cannot recover from the occurrence of the error, forcing a reset of the computing system.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 26 is a non-transitory machine-readable storage medium including instructions that, when executed by a non-microcoded processing device, cause the non-microcoded processing device to perform operations comprising obtain an occurrence of an error, the occurrence of the error causing the non-microcoded processing device to enter an error monitoring state, process the error using a dedicated memory portion for the error monitoring state while the non-microcoded processing device is in the error monitoring state, wherein the error monitoring state is dedicated to error processing, and determine information associated with the error, wherein the information associated with the error is in a predefined format.

In Example 27, the operations of Example 26 can optionally comprise sending a resume message to another processing device to cause the another processing device to resume execution in an execution state other than the error monitoring state.

In Example 28, the operations of Example 26 can optionally comprise determining whether to resume execution of an application that was interrupted based on the occurrence of the error, upon determining to resume execution of the application that was interrupted based on the occurrence of the error, causing the execution of the application to resume, upon determining not to resume execution of the application that was interrupted based on the occurrence of the error, determining if a computing system associated with the error can recover from the occurrence of the error, upon determining that the computing system can recover from the occurrence of the error, passing control to an operating system to handle the error, and upon determining that the computing system cannot recover from the occurrence of the error, forcing a reset of the computing system.

In Example 29, the operations of Example 26 can optionally comprise upon determining that another processing device should not execute instructions, instructing the another processing device to stop executing instructions.

In Example 30, processing the error in the error monitoring state of Example 26 can optionally comprise sending a coherency message to another processing device, where the another processing device is in a non-error monitoring state.

Example 31 is a non-microcoded processing device comprising an error processing module to obtain an occurrence of an error, the occurrence of the error causing the non-microcoded processing device to enter the error monitoring state and to process the error using the dedicated memory portion while the non-microcoded processing device is in the error monitoring state, wherein the error monitoring state is dedicated to error processing, and an error information determination module to determine information associated with an error information determination module to determine information associated with the error, wherein the information associated with the error is in a predefined format.

In Example 32, to process the error in the error monitoring state, the error processing module of Example 31 can optionally upon obtaining a fault, suppress the fault, upon obtaining an additional error, mask the additional error, and allow a security policy associated with the processing device to be violated.

In Example 33, to determine information associated with the error, the error information determination module of Example 31 can optionally initiate a test by a hardware state machine, wherein the hardware state machine is dedicated to the error monitoring state and cannot be initiated in the first state, and obtain data based on the test by the hardware state machine.

In Example 34, to process the error in the error monitoring state, the error processing module of Example 31 can optionally upon determining that another processing device should not execute instructions, instruct the another processing device to perform at least one of: stop executing instructions, report status, or wait for resolution.

In Example 35, to process the error in the error monitoring state, the error processing module of Example 31 can optionally send a coherency message to another processing device, where the another processing device is in an execution state other than the error monitoring state.

Example 36 is an apparatus comprising means for obtain an occurrence of an error, the occurrence of the error causing a non-microcoded processing device to enter an error monitoring state, means for processing the error using the dedicated memory portion while the non-microcoded processing device is in the error monitoring state, wherein the error monitoring state is dedicated to error processing, and means for determining information associated with the error, wherein the information associated with the error is in a predefined format.

In Example 37, the apparatus of Example 36 can optionally be configured to perform the method of any one of the Examples 17 to 25.

Example 38 is at least one machine readable medium comprising a plurality of instructions that in response to being executed on a computing device, cause the computing device to carry out a method according to any one of Examples 16 to 25.

Example 39 is an apparatus for implementing a machine check architecture environment, configured to perform the method of any one of the Examples 16 to 25.

Example 40 is an apparatus comprising means for performing the method of any one of Examples 16 to 25.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "generating", "determining", "creating", "translating", "discarding", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The disclosure may be provided as a computer program product, or software, that may include a machine-readable medium having stored thereon instructions, which may be used to program a computer system (or other electronic devices) to perform a process according to the disclosure. A machine-readable medium includes any technology for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus comprising:
   a memory comprising a dedicated memory portion for an error monitoring state;
   a non-microcoded processing device coupled to the memory, the non-microcoded processing device to:
      obtain an occurrence of an error, the occurrence of the error causing the non-microcoded processing device to enter the error monitoring state;
      process the error using the dedicated memory portion while the non-microcoded processing device is in the error monitoring state, wherein the error monitoring state is dedicated to error processing; and
      determine information associated with the error, wherein the information associated with the error is in a predefined format.

2. The apparatus of claim 1, wherein to process the error in the error monitoring state, the non-microcoded processing device is to:
   upon obtaining a fault, suppress the fault;
   upon obtaining an additional error, mask the additional error; and
   allow a security policy associated with the processing device to be violated.

3. The apparatus of claim 2,
   wherein to suppress the fault, the non-microcoded processing device sets a fault suppress flag,
   wherein to mask the additional error, the non-microcoded processing device sets an error suppress flag,
   wherein to allow a security policy to be violated, the non-microcoded processing device sets a security policy violation flag, and
   wherein the non-microcoded processing device accesses at least one of the fault suppress flag, the error suppress flag, or the security policy violation flag to avoid causing additional errors.

4. The apparatus of claim 1, wherein to determine information associated with the error, the non-microcoded processing device is to:
   initiate a test by a hardware state machine, wherein the hardware state machine is dedicated to the error monitoring state and cannot be initiated in an execution state other than the error monitoring state; and
   obtain data based on the test by the hardware state machine.

5. The apparatus of claim 1, wherein to process the error in the error monitoring state, the non-microcoded processing device is to:
   upon determining that another processing device should not execute instructions, instruct the another processing device to perform at least one of: stop executing instructions, report status, or wait for resolution.

6. The apparatus of claim 1, wherein to process the error in the error monitoring state, the non-microcoded processing device is to:
   send a coherency message to another processing device, where the another processing device is in an execution state other than the error monitoring state.

7. The apparatus of claim 1, further comprising a severity register indicating a severity of the error, wherein the severity register is accessible only when the non-microcoded processing device is in the error monitoring state.

8. The apparatus of claim 1, wherein the non-microcoded processing device is further to prevent another processing device from modifying the dedicated memory portion for the error monitoring state.

9. The apparatus of claim 1, wherein the non-microcoded processing device is further to:
   cause a hardware operation to be performed to test operation of hardware associated with the apparatus; and
   obtain a result of the hardware operation as the information associated with the error.

10. The apparatus of claim 1, wherein the non-microcoded processing device is further to:
    store the information associated with the error in a data structure in a portion of the memory dedicated to a machine check architecture.

11. The apparatus of claim 1, wherein the non-microcoded processing device is further to:
    determine whether to resume execution of an application that was interrupted based on the occurrence of the error;
    upon determining to resume execution of the application that was interrupted based on the occurrence of the error, cause the execution of the application to resume;

upon determining not to resume execution of the application that was interrupted based on the occurrence of the error, determine if the apparatus can recover from the occurrence of the error;

upon determining that the apparatus can recover from the occurrence of the error, pass control to an operating system to handle the error; and upon determining that the apparatus cannot recover from the occurrence of the error, force a reset of the apparatus.

12. A method for building a virtual device, the method comprising:

obtaining an occurrence of an error, the occurrence of the error causing a non-microcoded processing device to enter an error monitoring state;

processing, by the non-microcoded processing device, the error using a dedicated memory portion for the error monitoring state while the non-microcoded processing device is in the error monitoring state, wherein the error monitoring state is dedicated to error processing; and determining information associated with the error, wherein the information associated with the error is in a predefined format.

13. The method of claim 12, wherein processing the error in the error monitoring state comprises:

upon obtaining a fault, suppressing the fault;

upon obtaining an additional error, masking the additional error; and allowing a security policy associated with the processing device to be violated.

14. The method of claim 13, wherein suppressing the fault comprises setting a fault suppress flag, wherein masking the additional error comprises setting an error suppress flag, wherein allowing a security policy to be violated comprises setting a security policy violation flag, and wherein the method further comprises accessing at least one of the fault suppress flag, the error suppress flag, or the security policy violation flag to avoid causing additional errors.

15. The method of claim 12, wherein determining information associated with the error comprises:

initiating a test by a hardware state machine, wherein the hardware state machine is dedicated to the error monitoring state and cannot be initiated in a first state; and obtaining data based on the test by the hardware state machine.

16. The method of claim 12, wherein processing the error in the error monitoring state comprises:

upon determining that another processing device should not execute instructions, instructing the another processing device to perform at least one of: stop executing instructions, report status, or wait for resolution;

sending a coherency message to another processing device, where the another processing device is in an execution state other than the error monitoring state; and preventing another processing device from modifying the dedicated memory portion.

17. The method of claim 12, further comprising:

causing a hardware operation to be performed to test operation of hardware associated with the error; and obtaining a result of the hardware operation as the information associated with the error.

18. A non-transitory machine-readable storage medium including instructions that, when executed by a non-microcoded processing device, cause the non-microcoded processing device to perform operations comprising:

obtain an occurrence of an error, the occurrence of the error causing the non-microcoded processing device to enter an error monitoring state;

process the error using a dedicated memory portion for the error monitoring state while the non-microcoded processing device is in the error monitoring state, wherein the error monitoring state is dedicated to error processing; and determine information associated with the error, wherein the information associated with the error is in a predefined format.

19. The non-transitory machine-readable storage medium of claim 18, wherein the operations further comprise:

sending a resume message to another processing device to cause the another processing device to resume execution in an execution state other than the error monitoring state.

20. The non-transitory machine-readable storage medium of claim 18, wherein the operations further comprise:

determining whether to resume execution of an application that was interrupted based on the occurrence of the error;

upon determining to resume execution of the application that was interrupted based on the occurrence of the error, causing the execution of the application to resume;

upon determining not to resume execution of the application that was interrupted based on the occurrence of the error, determining if a computing system associated with the error can recover from the occurrence of the error;

upon determining that the computing system can recover from the occurrence of the error, passing control to an operating system to handle the error; and upon determining that the computing system cannot recover from the occurrence of the error, forcing a reset of the computing system.

* * * * *